Dec. 22, 1936.                H. G. R. BENNETT                2,065,420
                              ADJUSTABLE SHEAR GAUGE
                              Filed May 11, 1936            2 Sheets-Sheet 1
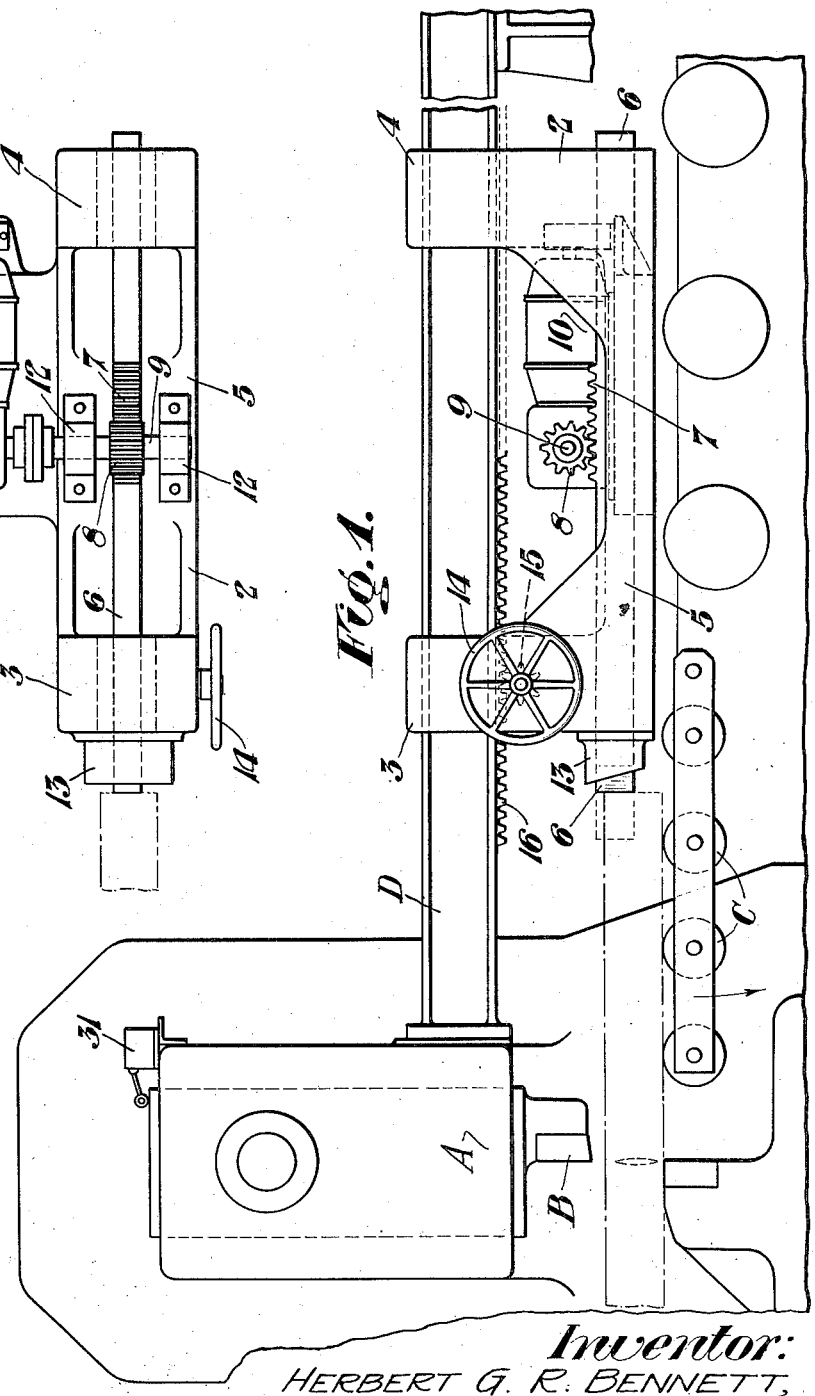

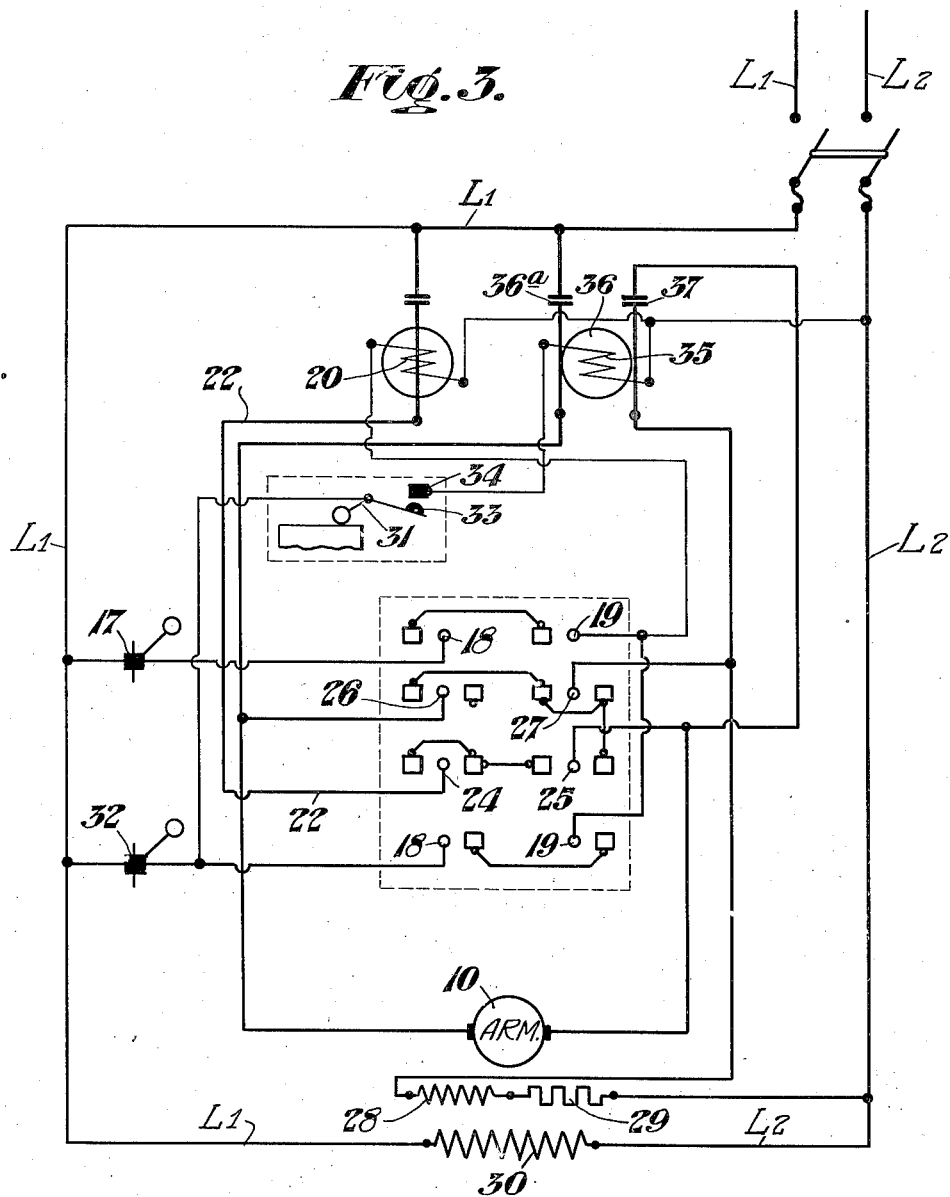

Patented Dec. 22, 1936

2,065,420

UNITED STATES PATENT OFFICE 2,065,420

ADJUSTABLE SHEAR GAUGE

Herbert G. R. Bennett, Duquesne, Pa.

Application May 11, 1936, Serial No. 79,153

12 Claims. (Cl. 164—59)

The present invention relates to an adjustable gauge device for shearing mechanism which provides means whereby a quick adjustment of the bar to correct shearing position is accomplished as well as means permitting automatic retraction of the work positioning member, upon downward movement of the shearing mechanism, to protect it against damage caused by the shock resulting from the shearing of the material.

An object of the present invention is to provide means for supporting a housing member on which is movable, in a forward or reverse direction, a work positioning member or ram, operable to position the material in proper position for shearing and includes means, automatically controlled, to regulate the extent of the forward and reverse movement of the ram.

A further object is to provide an electrically controlled motor circuit for operating the ram in its forward and reverse movement with means, electrically controlled, for stopping the forward and reverse position at predetermined positions.

With these and other advantages which will become apparent as the disclosure proceeds, Figure 1 is a side elevation of a shearing mechanism with the adjustable shear gauge in co-operating position, Figure 2 is a plan view of the gauge mechanism, and Figure 3 is a wiring diagram showing the circuit for controlling the movements of the gauge mechanism.

In the drawings, there is shown a shearing mechanism, generally indicated at A having a shear knife B under which is provided the usual table feed rolls C. Projecting from the shearing mechanism is a gauge beam D suitably supported. Mounted for movement on said gauge beam D is a housing 2 provided with depending flanges 3 and 4 which terminate in a supporting surface 5 on which is longitudinally positioned, for movement in either a forward or reverse direction, a work positioning member or ram 6 provided on its upper surface with a rack portion 7. This rack portion 7 is adapted to intermesh with a pinion 8 carried by shaft 9 extending from the motor 10. This shaft 9 is suitably supported in bearing members 12 mounted on the housing 2. The motor is operated through a controller mechanism, to be subsequently explained, in the operation, to effect movement of the ram 6 in a forward or reverse direction as well as to automatically limit the forward and rearward movement of the same and to automatically retract the ram from its work engaging position.

Mounted at the forward end of the housing 2 is a stop 13 adjusted to the desired position relative to the shearing mechanism by means of the handwheel 14 on the flange 3 carrying the pinion 15 which meshes with the rack 16 on the gauge beam D. After the gauge has been moved to its predetermined position, and the material to be cut has been advanced to abut against the stop 13, it may be necessary to move the material back a small degree to bring the score line under the shearing mechanism and this feature, together with the remaining operations are carried out in the following manner.

The bar to be sheared is advanced over the roll table until it has been brought to a position almost touching the end of the shear gauge which is in its full reverse position. The switch shown in the diagram is closed, energizing the supply lines L1 and L2. As before stated, this may not bring the bar into correct position for shearing at the score line and if this be the case, and it is desired to move the bar back to bring the score line in correct shearing position, the operator throws the controller in a forward position. This closes the circuit from L1, through the normally closed forward limit switch 17, the controller fingers 18 and 19 and through the coil 20 of the normally open contactor to the supply line L2. This energizes the coil 20 causing it to close and permitting current to flow through line L1 to 22, the controller fingers 24 and 25, through the armature of the motor 10 to the contactor 26 from which the current flows to the controller finger 27 and through the series field coil 28 and brake coil 29 of the motor to the supply line L2. This circuit causes the motor to rotate in a forward direction, the shunt field 30 of the motor 10 being always energized from the supply lines L1 and L2. The motor through the shaft 9 and pinion 8 engages the rack 7 on the ram which causes the same to move forwardly and advance the bar back under the shear knife. When the bar has reached the proper shearing position, the operator throws the controller to the off-position, which opens the armature circuit of the motor causing it to stop and due to the slow speed of the ram and the friction between the bar and table, prevent any drifting of the same.

The bar which is now in position to be sheared permits the operator to close the circuit to the shearing mechanism to effect severing of the bar on its score line. On the downward movement of the shear knife B, the normally open limit switch 31, is closed, which permits current to flow from the supply line L1 through the normally closed reverse limit switch 32, through the contacts 33 and 34, through the coil 35 of the normally open contactor 36 to the supply line L2. This energizes the coil 35, causing it to close and permit the flow of current from supply line L1 through the contact 36ª of coil 36 to the armature of the motor 19 to contact 25, through the other contact 37 of coil 36 to the series field 28 and brake coil 29 of the motor to the supply line L2. This causes the motor to operate in the reverse direction and retract the ram 6 away from the bar so that the ram engaging structure will not be damaged as the bar is being sheared. If the ram 6 was permitted to remain in abutting position against the bar during the shearing action, there might be considerable damage done to the gauge structure in that the tendency of the free end of the bar, abutting the ram, is to flare upwardly as it is being sheared.

The reverse rotation of the motor to retract the ram through the pinion and rack construction, toward its original position is continued until it trips the reverse limit switch 32 which subsequently opens the circuit energizing the coil 35 of the normally open contactor 36 and as this coil is de-energized the circuit to the motor is broken causing it to stop. This cycle of operation brings the gauge apparatus back to its original position and after the bar has been sheared, the operation is repeated for the next bar.

The normally open limit switch 31 is opened as soon as the shear knife is raised to its normal inoperative position. The reverse limit switch 32 is reset as the shear gauge is moved in a forward direction. The forward limit switch 17 is positioned along the gear rack so as to open the armature circuit and stop the motor in case the motor is started in its forward directon and left unattended.

While I have shown and described one specific embodiment of my invention, it will be understood that I do not wish to be limited exactly thereto, since various modifications may be made without departing from the scope of my invention, as defined by the following claims:

I claim:

1. An adjustable shear gauge comprising a housing, a support for said housing, a stop carried by said housing, a work engaging member concentric with said stop and movable on said housing, means permitting said work engaging member to adjust the work to a correct shearing position, and means adapted to automatically withdraw said work engaging member from contact with the work.

2. In combination with a shearing mechanism, of means adapted to properly position material to be cut at predetermined score lines, comprising a housing mounted on a support, a stop carried by said housing, a work engaging member concentric with said stop and movable on said housing, means adapted to position the work in a correct shearing position, and means adapted to automatically withdraw said work engaging member from its work engaging position upon the downward movement of the shearing mechanism to protect said work engaging member from damage by the shock resulting from the shearing operation.

3. An adjustable shear gauge comprising a housing, a support for said housing, a stop on said housing, a work engaging member concentric with said stop, means adapted to move said work engaging member on said housing and means controlling the forward movement of said work engaging member and means adapted to automatically withdraw said work-engaging member from contact with the work simultaneously with the downward movement of the shear.

4. An adjustable shear gauge comprising a housing, a support for said housing, a stop on said housing, a work engaging member concentric with said stop, means adapted to move said work engaging member on said housing and means controlling the rearward movement of said work engaging member and means adapted to automatically withdraw said work-engaging member from contact with the work simultaneously with the downward movement of the shear.

5. An adjustable shear gauge comprising a housing, a support for said housing, a stop on said housing, a work engaging member concentric with said stop, means adapted to move said work engaging member on said housing and means controlling the forward and rearward movement of said work engaging member and means adapted to automatically withdraw said work-engaging member from contact with the work simultaneously with the downward movement of the shear.

6. An adjustable shear gauge comprising a housing, a support for said housing, a stop on said housing, a work engaging member, means adapted to move said work engaging member on said housing and electrically controlled means associated with a shear for regulating the rearward movement of said work engaging member.

7. In combination with a shearing mechanism, of means comprising a gauge, a stop on said gauge, a ram concentric with said stop and movable on said gauge, means adapted to move said ram forwardly to position the material in proper cutting position and means responsive to the downward movement of said shearing mechanism to automatically retract said ram from the material to protect said ram from damage by the shock resulting from the shearing operation.

8. In combination with a shearing mechanism, of means comprising a gauge, a stop on said gauge, a ram concentric with said stop and movable on said gauge, means adapted to move said ram forwardly to position the material in proper cutting position, means responsive to the downward movement of said shearing mechanism to automatically retract said ram from the material to protect said ram from damage by the shock resulting from the shearing operation and means adapted to automatically control the forward and reverse movement of said ram.

9. In a shearing device, of means adapted to position the material at the proper cutting positions including a gauge housing, a support for said housing, a stop on said housing, a motor carried by said housing, a motor shaft, a pinion carried by said shaft, a ram movable on said housing, a rack on said ram engaging said pinion and means adapted to control the forward and reverse rotation of said motor to advance or retard said ram on said housing to permit said ram to engage or disengage the material.

10. In a shearing device, of means adapted to position the material at the proper cutting positions including a gauge housing, a support for said housing, a stop on said housing, a motor carried by said housing, a motor shaft, a pinion carried by said shaft, a ram movable on said housing, a rack on said ram engaging said pinion, means adapted to control the forward and reverse rotation of said motor to advance or retard said ram on said housing to permit said ram to engage or disengage the material, and means responsive to the shearing operation to automatically retract said ram.

11. In a shearing device, of means adapted to position the material at the proper cutting positions including a gauge housing, a support for said housing, a stop on said housing, a motor carried by said housing, a motor shaft, a pinion carried by said shaft, a ram movable on said housing, a rack on said ram engaging said pinion, means adapted to control the forward and reverse rotation of said motor to advance or retard said ram on said housing to permit said ram to engage or disengage the material, means responsive to the shearing operation to automatically retract said ram, and means adapted to automatically limit the forward and reverse movement of said ram.

12. An adjustable shear gauge comprising a housing, a support for said housing, a stop mounted on the housing adapted to limit the movement of the material, a work positioning member movable on said housing, means adapted to control the forward and rearward movement of said work positioning member and means adapted to automatically limit the forward and reverse movement of said member.

HERBERT G. R. BENNETT.